US009800129B2

(12) United States Patent
Ortiz

(10) Patent No.: US 9,800,129 B2
(45) Date of Patent: Oct. 24, 2017

(54) BIDIRECTIONAL LOW VOLTAGE POWER SUPPLY (LVPS) WITH SINGLE PULSE WIDTH MODULATOR (PWM), CRYOGENIC COOLER SYSTEM, AND METHOD

(71) Applicant: Raytheon Company, Waltham, MA (US)

(72) Inventor: Joe Anthony Ortiz, Garden Grove, CA (US)

(73) Assignee: Raytheon Company, Waltham, MA (US)

( * ) Notice: Subject to any disclaimer, the term of this patent is extended or adjusted under 35 U.S.C. 154(b) by 369 days.

(21) Appl. No.: 14/612,357

(22) Filed: Feb. 3, 2015

(65) Prior Publication Data

US 2016/0043623 A1  Feb. 11, 2016

Related U.S. Application Data

(60) Provisional application No. 62/034,889, filed on Aug. 8, 2014.

(51) Int. Cl.
| | |
|---|---|
| *H02P 27/04* | (2016.01) |
| *H02M 1/00* | (2006.01) |
| *H02M 3/335* | (2006.01) |
| *H02M 3/28* | (2006.01) |

(52) U.S. Cl.
CPC ............. *H02M 1/00* (2013.01); *H02M 3/285* (2013.01); *H02M 3/33523* (2013.01); *H02M 3/33553* (2013.01); *H02M 3/33584* (2013.01); *H02M 2001/0067* (2013.01)

(58) Field of Classification Search
USPC ................. 318/503; 363/67, 71, 79
See application file for complete search history.

(56) References Cited

U.S. PATENT DOCUMENTS

| | | | | |
|---|---|---|---|---|
| 4,481,449 | A | * | 11/1984 | Rodal ..................... G11B 15/22 318/134 |
| 5,109,185 | A | | 4/1992 | Ball |
| 5,428,523 | A | | 6/1995 | Mcdonnal |

(Continued)

FOREIGN PATENT DOCUMENTS

| | | | | |
|---|---|---|---|---|
| DE | 102011082730 A1 | * | 3/2013 | .......... H02M 3/1584 |
| WO | WO-2016022932 A1 | | 2/2016 | |

OTHER PUBLICATIONS

"International Application Serial No. PCT/US2015/044237, International Search Report mailed Oct. 27, 2015", 3 pgs.

(Continued)

*Primary Examiner* — Eduardo Colon Santana
*Assistant Examiner* — Iftekhar Mustafa
(74) *Attorney, Agent, or Firm* — Schwegman Lundberg & Woessner, P.A.

(57) ABSTRACT

Embodiments of a bidirectional low voltage power supply (LVPS) with a single pulse width modulator and method are generally described herein. In some embodiments, the bidirectional LVPS may include a first converter arranged to provide power from an input power source to a load and a second converter arranged to selectively recycle power from the load at an output of the first converter back to the input power source. Control circuitry may include switching circuitry that may be configured to select either the first power converter or the second power converter for reception of an output of a single PWM.

24 Claims, 2 Drawing Sheets

(56) References Cited

U.S. PATENT DOCUMENTS

| | | | |
|---|---|---|---|
| 5,726,550 | A | 3/1998 | Inaniwa et al. |
| 6,771,519 | B2 * | 8/2004 | Frus ................. H02M 3/33507 |
| | | | 123/406.57 |
| 9,048,720 | B2 | 6/2015 | Ortiz |
| 2012/0049772 | A1 | 3/2012 | Moussaoui et al. |
| 2013/0093241 | A1 | 4/2013 | Lewis |
| 2013/0278214 | A1 | 10/2013 | Satoh |
| 2014/0292236 | A1 | 10/2014 | Ortiz |

OTHER PUBLICATIONS

"International Application Serial No. PCT/US2015/044237, Written Opinion mailed Oct. 27, 2015", 6 pgs.

Dalal, Dhaval, "A Unique Four Quadrant Flybank Converter", [online]. (c) 2001 Texas Instruments Incorporated. [ archived on Feb. 15, 2012]. Retrieved from the Internet: <URL: https://web.archive.org/web/20120215000000*/http://www.ti.com/lit/ml/slup116/slup116.pdf>, (2001), 5-1—5-15.

"U.S. Appl. No. 13/855,298, Notice of Allowance mailed Jan. 23, 2015", 12 pgs.

"International Application Serial No. PCT/US2015/044237, International Preliminary Report on Patentability mailed Feb. 23, 2017", 8 pgs.

* cited by examiner

BIDIRECTIONAL LOW VOLTAGE POWER SUPPLY (LVPS) WITH SINGLE PULSE WIDTH MODULATOR (PWM), CRYOGENIC COOLER SYSTEM, AND METHOD

PRIORITY CLAIM

This application claims priority under 35 U.S.C. 119(e) to U.S. Provisional Patent Application Ser. No. 62/034,889, filed Aug. 8, 2014 which is incorporated herein by reference in its entirety.

TECHNICAL FIELD

Embodiments pertain to power sources and power supplies. Some embodiments relate to bidirectional low voltage power supplies. Some embodiments relate to cryogenic cooler systems. Some embodiments relate to motor systems, motor drive electronics and motors.

BACKGROUND

Some motor applications, such as cryogenic cooler motors, can act as power sources during certain operating conditions and in some part of their operating cycle. The motor drive electronics may be configured to sink power from the motor as well as source power to the motor. Historically, power sourced from cryocooler motors has been dissipated.

Thus there are general needs for more efficient motor systems including cryogenic cooler systems. There are also general needs for more efficient power supplies suitable for systems, such as motor drive systems and cryogenic cooler systems.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
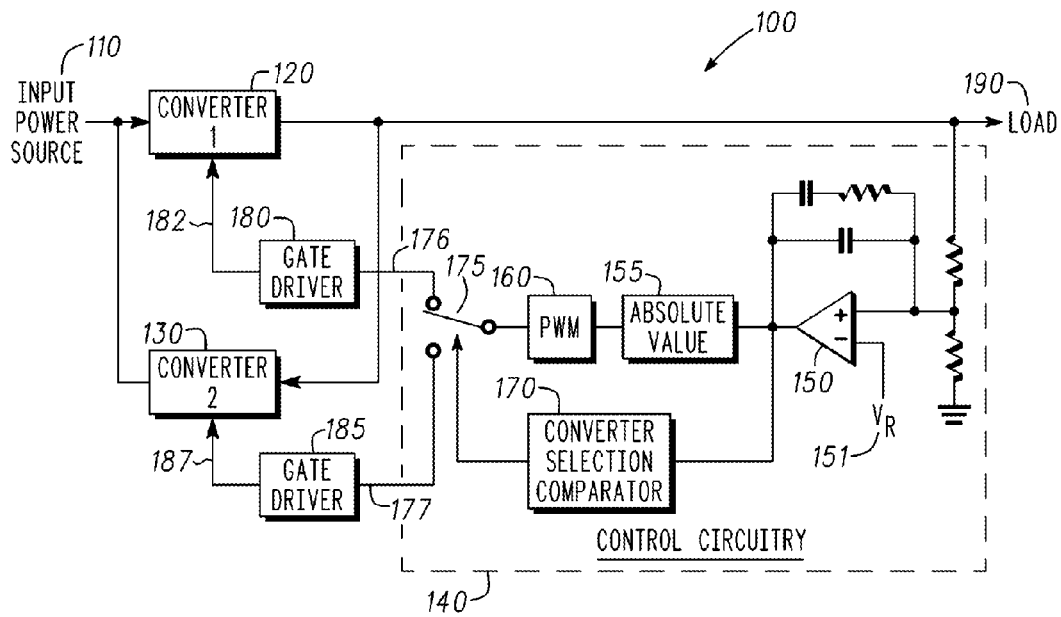
FIG. 1 is a functional diagram of a bidirectional low voltage power supply (LVPS) in accordance with some embodiments.

FIG. 1 is a functional diagram of a bidirectional low voltage power supply (LVPS) in accordance with some embodiments. The bidirectional low voltage power supply (LVPS) 100 may include a first converter 120 arranged to provide power from an input power source 110 to a load 190, and a second converter 130 arranged to selectively recycle power from the load 190 at an output of the first converter 120 back to the input power source 110. The bidirectional low voltage power supply 100 may also include control circuitry 140. The control circuitry may include, among other things, a single pulse width modulator (PWM) 160 and switching circuitry 175. The switching circuitry 175 may be configured to select either the first power converter 120 or the second power converter 130 for reception of the output of the PWM 160.

In these embodiments, the single bidirectional LVPS 100 may be used to power the load 190 and recycle power returned from the load 190 back to the input power source 110. This may increase system efficiency and may reduce the thermal load. Unlike some conventional systems, the single PWM 160 is used to control both converters (i.e., converter 120 and converter 130). An example of a bidirectional LVPS that uses two separate converters with each converter having a PWM is described in U.S. patent application Ser. No. 13/855,295 which is assigned to the same assignee as the present application and which is incorporated herein by reference.

In some embodiments, the switching circuitry 175 may be configured to selectively provide either a first gate drive signal 176 to the first power converter 120 or a second gate drive signal 177 to the second power converter 130 to cause only one of the power converters 120 or 130 to operate at any one time. In these embodiments, the first converter 120 may be configured to regulate voltage to the load 190 when the load 190 is sinking power and the second converter 130 may be configured to regulate voltage to the load 190 when the load is sourcing power. In some motor drive and cryogenic cooler embodiments, the first converter 120 is configured to regulate voltage to motor drive electronics when a motor is sinking power, and the second converter 130 is configured to regulate voltage to the motor drive electronics when the motor is sourcing power, although the scope of the embodiments is not limited in this respect.

In some embodiments, a first gate drive circuit 180 may be configured to provide a gate drive signal 182 to drive one or more converter switch transistors of the first power converter 120. A second gate drive circuit 185 may be configured to provide a gate drive signal 187 to drive one or more converter switch transistors of the second power converter 130. In some embodiments, the first gate drive circuit 180 and/or the second gate drive circuit 185 may be isolated gate drives, although the scope of the embodiments is not limited in this respect.

In some embodiments, the switching circuitry 175 may be arranged to cause the LVPS 100 to switch between operation of the first power converter 120 to provide power from the input power source 110 to the load 190 and operation of the second power converter 130 to recycle power from the load 190 back to the input power source 110. In some embodiments, the input power source 110 may be an input power bus, although the scope of the embodiments is not limited in this respect.

In some embodiments, the control circuitry 140 may also comprise an error amplifier 150, an absolute value circuit 155 and a converter selection comparator 170. In these embodiments, the absolute value circuit 155 may be configured to provide the absolute value of the difference between the output voltage of the error amplifier 150 and zero volts. The converter selection comparator 170 may be configured to cause the switching circuitry 175 to switch an output of the pulse width modulator 160 between the first power converter 120 and the second power converter 130. In some of these embodiments, the regulated power supply output voltage and the reference voltage 151 may be any suitable positive voltage, although the scope of the embodiments is not limited in this respect as other output voltages and reference voltages may be used. In some embodiments, the absolute value circuit 155 may be configured to provide a signal into the PWM 160 equal to the difference between the output of the error amplifier 150 and a second reference voltage.

The control circuitry 140 illustrated in FIG. 1 is provided as an example configuration. Other configurations for the control circuitry 140 may also be suitable for use in the bidirectional LVPS 100.

In some embodiments, the bidirectional LVPS 100 may be a bidirectional motor driver LVPS configured to provide power to motor drive electronics of a motor drive system. In these embodiments, the load 190 may comprise the motor drive electronics and the motor, although the scope of the embodiments is not limited in this respect. In some embodiments, the first converter 120 may be configured to regulate voltage to the motor drive electronics when the motor is sinking power and the second converter 130 may be configured to regulate voltage to the motor drive electronics when the motor is sourcing power. In some embodiments, the motor may be a cryogenic cooler motor, although the scope of the embodiments is not limited in this respect. In some example embodiments, the bidirectional LVPS 100 may save up to 20 Watts or more over some conventional techniques which provides a significant improvement in efficiency.

Some embodiments are directed to a cryogenic cooler system. In these embodiments, the cryogenic cooler system may include motor drive electronics and a bidirectional motor driver LVPS 100 configured to provide power to the motor drive electronics of a motor drive system. In these embodiments, the bidirectional motor drive LVPS may comprise a first converter 120 arranged to provide power from an input power source 110 to a load comprising the motor drive electronics and a motor, a second converter 130 arranged to selectively recycle power from the load 190 at an output of the first converter 120 back to the input power source 110, and control circuitry 140 comprising a single PWM 160 and switching circuitry 175. In some embodiments, the switching circuitry 175 may be configured to select either the first power converter 120 or the second power converter 130 for reception of an output of the PWM 160.

In some of these cryogenic cooler system embodiments, the first converter 120 may be configured to regulate voltage to the motor drive electronics when the motor is sinking power and the second converter 130 may be configured to regulate voltage to the motor drive electronics when the motor is sourcing power, although the scope of the embodiments is not limited in this respect. In some of these cryogenic cooler system embodiments, the switching circuitry 175 may be configured to selectively provide either a first gate drive signal 176 to the first power converter 120 or a second gate drive signal 177 to the second power converter 130 to cause only one of the power converters to operate at the same time, although the scope of the embodiments is not limited in this respect.

Figure 2:
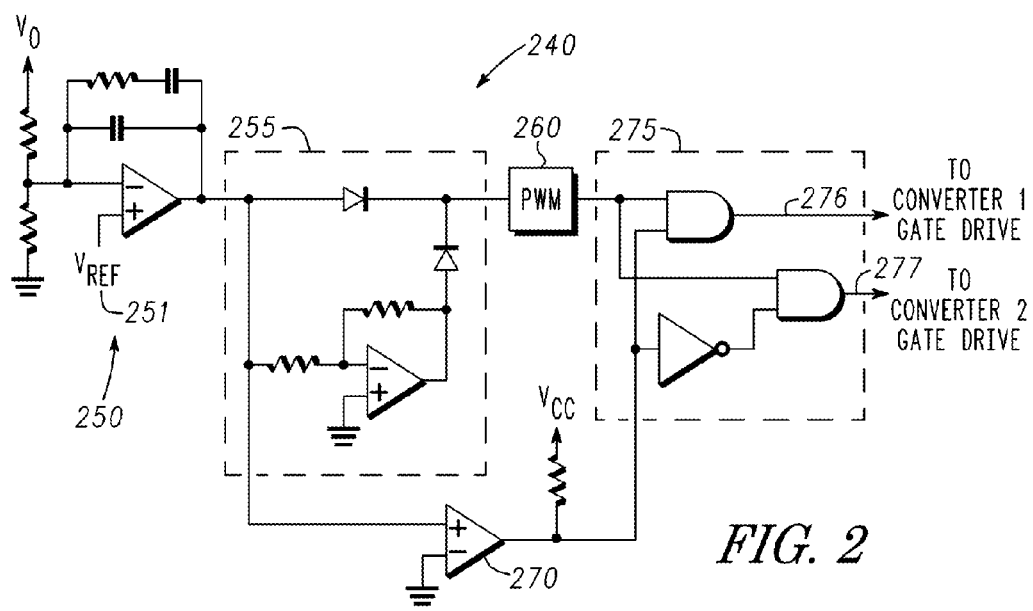
FIG. 2 illustrates control circuitry in accordance with some embodiments.

FIG. 2 illustrates control circuitry in accordance with some embodiments. Control circuitry 240 may be suitable for use as control circuitry 140 in bidirectional LVPS 100 (FIG. 1), although this is not a requirement as other examples of control circuitry may also be suitable.

Control circuitry 240 may comprise a single PWM 260 and switching circuitry 275 (i.e., a converter selection switch) that may be configured to select either the first power converter 120 (FIG. 1) or the second power converter 130 (FIG. 1). In these embodiments, the switching circuitry 275 may selectively provide either a first gate drive signal 276 to the first power converter 120 or a second gate drive signal 277 to the second power converter 130 to cause only one of the power converters 120 or 130 to operate at a time.

In some embodiments, a first output 276 from the switching circuitry 275 may be provided to the first gate drive circuit 180 (FIG. 1) and a second output 277 from the switching circuitry 275 may be provided to the second gate drive circuit 185 (FIG. 1). In these embodiments, the first gate drive circuit 180 may provide the first gate drive signal 182 to drive one or more converter switch transistors of the first power converter 120 and the second gate drive circuit 185 may provide a second gate drive signal 187 to drive one or more converter switch transistors of the second power converter 130.

In some embodiments, the control circuitry 240 may also comprise an error amplifier 250, an absolute value circuit 255 and a converter selection comparator 270. In these embodiments, the absolute value circuit 255 may be configured to provide an absolute value of the difference between the output of the error amplifier 250 and zero volts. The converter selection comparator 270 may be configured to cause the switching circuitry 275 to switch an output of the pulse width modulator 260 between the first power converter 120 and the second power converter 130.

Figure 3:
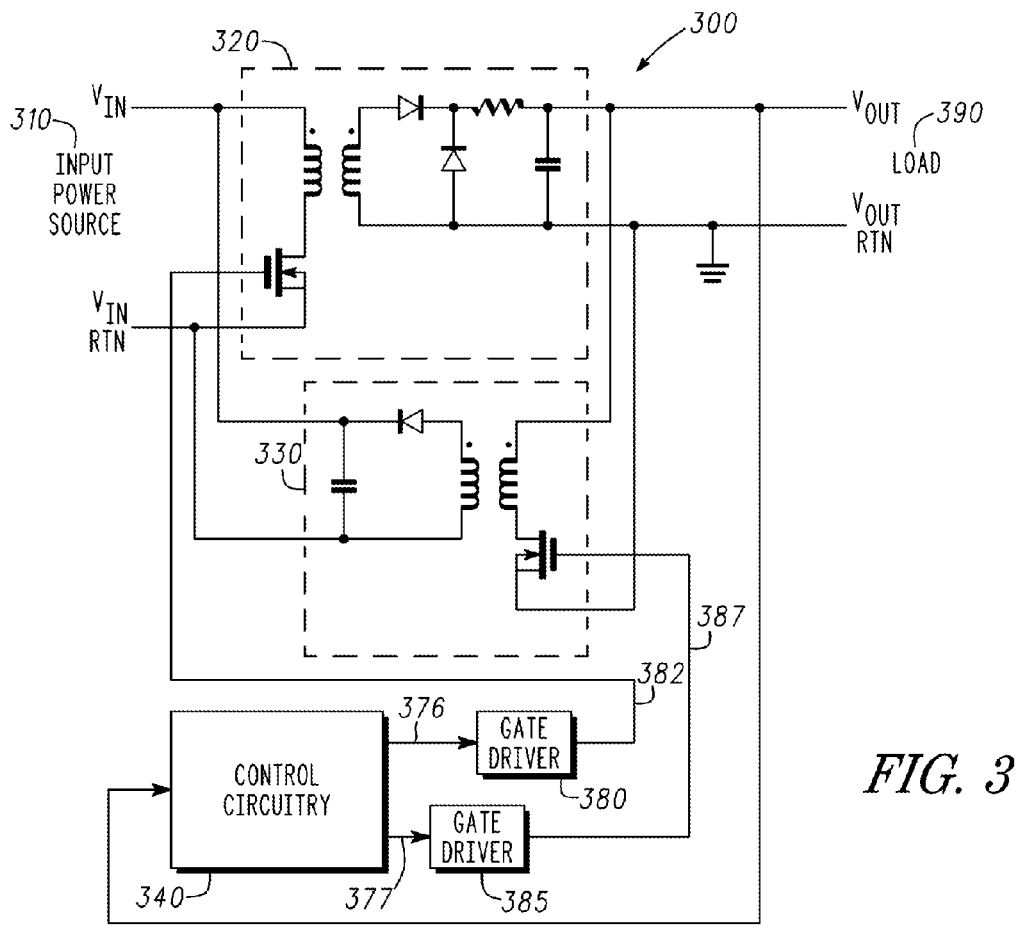
FIG. 3 illustrates a bidirectional low voltage power supply in accordance with some embodiments.

FIG. 3 illustrates a bidirectional low voltage power supply in accordance with some other embodiments. The bidirectional low voltage power supply 300 may be suitable for use as bidirectional low voltage power supply 100 (FIG. 1), although the scope of the embodiments is not limited in this respect. In these embodiments, the first converter 320 may arranged to provide power from the input power source 310 to the load 390, and the second converter 330 may be arranged to selectively recycle power from the load 390 at an output of the first converter 320 back to the input power source 310. The control circuitry 340 may comprise a single PWM and switching circuitry that may be configured to select either the first power converter 320 or the second power converter 330 for reception of an output of the PWM.

In some embodiments, control circuitry 140 (FIG. 1) and/or control circuitry 240 (FIG. 2) may be suitable for use as the control circuitry 340 (FIG. 3), although this is not a requirement.

In some of these embodiments, a first output 176 from the switching circuitry 175 (FIG. 1) may be provided to the first gate drive circuit 180 (FIG. 1) and a second output 177 from the switching circuitry 175 may be provided to the second gate drive circuit 185 (FIG. 1). In these embodiments, the first gate drive circuit 380 may provide the first gate drive signal 382 to drive one or more converter switch transistors of the first power converter 320 and the second gate drive circuit 385 may provide a second gate drive signal 387 to drive one or more converter switch transistors of the second power converter 330.

Figure 4:
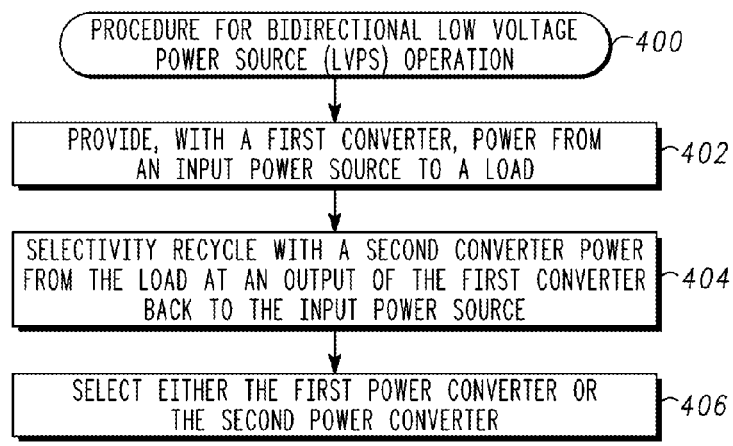
FIG. 4 illustrates a procedure for bidirectional low-voltage power supply operation in accordance with some embodiments.

FIG. 4 illustrates a procedure for bidirectional low-voltage power supply operation in accordance with some embodiments. Procedure 400 may be performed by a bidirectional low-voltage power supply, such as the bidirectional LVPS 100 (FIG. 1), although the scope of the embodiments is not limited is this respect as other bidirectional low-voltage power supply configurations may also be used.

Operation 402 may comprise providing, by a first converter 120 (FIG. 1) arranged to provide power from an input power source 110 (FIG. 1) to a load 190 (FIG. 1).

Operation 404 may comprise selectively recycling, by a second converter 130 (FIG. 1), power from the load 190 at an output of the first converter 120 back to the input power source 110.

Operation 406 may comprise selectively switching either the first power converter 120 or the second power converter 130 for reception of an output of a single PWM 160 (FIG. 1). Operation 406 may be performed by control circuitry, such as control circuitry 140 (FIG. 1).

Although the bidirectional low voltage power supply 100 (FIG. 1), the control circuitry 240 (FIG. 2) and the bidirectional low voltage power supply 300 (FIG. 3) are illustrated as having several separate functional elements, one or more of the functional elements may be combined and may be implemented by combinations of digital electronics, such as digital PWMs, firmware-configured or software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), and combinations of various hardware and logic circuitry for performing at least the functions described herein. In some embodiments, the functional elements may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. Some embodiments may include one or more processors and may be configured with instructions stored on a computer-readable storage device.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A bidirectional low voltage power supply (LVPS), comprising:
    a first power converter arranged to provide power from an input power source to a load;
    a second power converter arranged to selectively recycle power from the load at an output of the first power converter back to the input power source; and
    control circuitry comprising a single pulse width modulator and switching circuitry, the switching circuitry configured to select either the first power converter or the second power converter for reception of an output of the pulse width modulator, the control circuitry further configured to provide an absolute value of a difference between an output of an error amplifier and zero volts,
    wherein the switching circuitry, under control of the control circuitry, is further configured to switch an output of the pulse width modulator between the first power converter and the second power converter depending on whether the load is sourcing or sinking power.

2. The bidirectional LVPS of claim 1, wherein the switching circuitry is configured to selectively provide either a first gate drive signal to the first power converter or a second gate drive signal to the second power converter to cause only one of the power converters to operate at a time.

3. The bidirectional LVPS of claim 2, further comprising:
    a first gate drive circuit to provide the first gate drive signal to drive one or more converter switch transistors of the first power converter; and
    a second gate drive circuit to provide a second gate drive signal to drive one or more converter switch transistors of the second power converter,
    wherein the first and second gate drive circuits are configured to receive an output from the switching circuitry.

4. The bidirectional LVPS of claim 2, wherein the switching circuitry is arranged to cause the LVPS to switch between operation of the first power converter to provide power from the input power source to the load and operation of the second power converter to recycle power from the load back to the input power source.

5. A bidirectional low voltage power supply (LVPS), comprising:
    a first power converter arranged to provide from an output power source to a load;
    a second power converter arranged to selectively recycle power form the load at an output of the first power converter back to the input power source; and
    control circuitry comprising:
        a single pulse width modulator;
        switching circuitry configured to:
            select either the first power converter for reception of an output of the pulse width modulator,
            selectively provide either a first gate drive signal the first power converter or a second gate drive signal to the second power converter to cause only one of the power converters to operate at a time, and
            cause the LVPS to switch between operation of the first power converter to provide power from the input power source to the load and operation of the second power converter to recycle power form the load back to the input power source;
        an error amplifier;
        an absolute value circuit configured to provide an absolute value of the difference between an output of the error amplifier and zero volts; and
        a converter selection comparator configured to cause the switching circuitry to switch an output of the pulse width modulator between the first power converter and second power converter.

6. The bidirectional LVPS of claim 5, wherein the absolute value circuit is configured to provide a signal into the pulse width modulator equal to the difference between the output of the error amplifier and zero volts.

7. The bidirectional LVPS of claim 6,
    wherein the bidirectional LVPS is a bidirectional motor driver LVPS configured to provide power to motor drive electronics of a motor drive system, and
    wherein the load comprises the motor drive electronics and a motor.

8. The bidirectional LVPS of claim 7,
wherein the first power converter is configured to regulate voltage to the motor drive electronics when the motor is sinking power, and
wherein the second power converter is configured to regulate voltage to the motor drive electronics when the motor is sourcing power.

9. The bidirectional LVPS of claim 8, wherein the motor is a cryogenic cooler motor.

10. A method for operating a bidirectional low voltage power supply (LVPS), the method comprising:
providing, by a first power converter, power from an input power source to a load;
selectively recycling, by a second power converter, power from the load at an output of the first power converter back to the input power source;
selecting either the first power converter or the second power converter for operation to receive an output of a single pulse width modulator;
providing an absolute value of a difference between an output of an error amplifier and zero volts; and
switching an output of the pulse width modulator between the first power converter and the second power converter depending on whether the load is sourcing or sinking power.

11. The method of claim 10, further comprising:
selectively providing either a first gate drive signal to the first power converter or a second gate drive signal to the second power converter to cause only one of the power converters to operate at a time.

12. The method of claim 11, further comprising:
providing the first gate drive signal to drive one or more converter switch transistors of the first power converter; and
providing a second gate drive signal to drive one or more converter switch transistors of the second power converter.

13. The method of claim 11, wherein the selectively providing configures the LVPS to switch between operation of the first power converter to provide power from the input power source to the load and operation of the second power converter to recycle power from the load back to the input power source.

14. A method for operating a bidirectional low voltage power supply (LVPS), the method comprising:
providing, by first power converter, power from an input power source to a load;
selectively recycling, by a second power converter, power from the load at an output of the first power converter back to the input power source;
selecting either the first power converter or the second power converter for an operation to receive an output of a single pulse width modulator;
selectively providing either a first gate drive signal to the first power converter or a second gate drive signal to the second power converter to cause only one of the power converters to operate at a time, wherein the selectively providing configures the LVPS to switch between operation of the first power converter to provide power form the input power source to the load and operation of the second power converter to recycle power from the load back to the input power source;
providing an absolute value of the difference between an output of an error amplifier and zero volts; and
causing switching circuitry to switch an output of the pulse-width modulator between the first power converter and second power converter depending on whether the load is sourcing or sinking power.

15. A method for operating a bidirectional low voltage power supply (LVPS), the method comprising:
providing, by a first power converter, power from an input power source to a load;
selectively recycling, by a second power converter, power from the load at an output of the first power converter back to the input power source;
selecting either the first power converter or the second power converter for operation to receive an output of a single pulse width modulator;
selectively providing either a first gate drive to the first power converter or a second gate drive signal to the second power converter to cause only one of the power converters to operate at a time, wherein the selectively providing configures the LVPS to switch between operation of the first power converter to provide power form the input power source to the load and operation of the second power converter to recycle power from the load back to the input power source; and
providing a signal into the pulse width modulator equal to the difference between the output of the error amplifier and zero volts.

16. A cryogenic cooler system, comprising:
motor drive electronics; and
a bidirectional motor driver low voltage power supply (LVPS) configured to provide power to the motor drive electronics of a motor drive system, the bidirectional motor drive LVPS comprising:
a first power converter arranged to provide power from an input power source to a load comprising the motor drive electronics and a motor;
a second power converter arranged to selectively recycle power from the load at an output of the first power converter back to the input power source; and
control circuitry comprising a single pulse width modulator and switching circuitry, the switching circuitry configured to select either the first power converter or the second power converter for reception of an output of the pulse width modulator, the control circuitry further configured to provide an absolute value of a difference between an output of an error amplifier and zero volts,
wherein the switching circuitry, under control of the control circuitry, is further configured to switch an output of the pulse width modulator between the first power converter and second power converter depending on whether the load is sourcing or sinking power.

17. The cryogenic cooler system of claim 16,
wherein the first power converter is configured to regulate voltage to the motor drive electronics when the motor is sinking power, and
wherein the second power converter is configured to regulate voltage to the motor drive electronics when the motor is sourcing power.

18. The cryogenic cooler system of claim 17, wherein the switching circuitry is configured to selectively provide either a first gate drive signal to the first power converter or a second gate drive signal to the second power converter to cause only one of the power converters to operate at the same time.

19. A non-transitory computer-readable storage medium that stores instructions for execution by one or more processors to configure a bidirectional low voltage power supply (LVPS) to perform operations to:

provide, by a first power converter, power from an input power source to a load;

selectively recycle, by a second power converter, power from the load at an output of the first power converter back to the input power source;

select either the first power converter or the second power converter for operation to receive an output of a single pulse width modulator;

provide an absolute value of a difference between an output of an error amplifier and zero volts; and switch an output of the pulse width modulator between the first power converter and the second power converter depending on whether the load is sourcing or sinking power.

20. The non-transitory computer-readable storage medium of claim 19, wherein the instructions further configure the bidirectional LVPS to selectively provide either a first gate drive signal to the first power converter or a second gate drive signal to the second power converter to cause only one of the power converters to operate at a time.

21. The non-transitory computer-readable storage medium of claim 20, wherein the instructions further configure the bidirectional LVPS to:

provide the first gate drive signal to drive one or more converter switch transistors of the first power converter; and provide a second gate drive signal to drive one or more converter switch transistors of the second power converter.

22. The non-transitory computer-readable storage medium of claim 21, wherein selectively providing configures the LVPS to switch between operation of the first power converter to provide power from the input power source to the load and operation of the second power converter to recycle power from the load back to the input power source.

23. A non-transitory computer-readable storage medium that stores instructions for execution by one or more processors to configure a bidirectional low voltage power supply (LVPS) to preform operations to:

provide, by a first power converter, power from an input power source to a load;

selectively recycle, by a second power converter, power from the load at an output of the first power converter back to the input power source;

select either the first power converter or the second power convert for operation to receive an output of a single pulse width modulator;

configure the bidirectional LVPS to selectively provide either a first gate drive signal to the first power converter or a second gate drive signal to the second power converter to cause only one of the power converters to operate at a time, wherein selectively providing configures the LVPS to switch between operation of the first power converter to provide power from the input power source to the load and operation of the second power converter to recycle power form the load back to the input power source;

provide the first gate drive signal to drive one or more converter switch transistors of the first power converter;

provide a second gate drive signal to drive one or more converter switch transistors of the second power converter;

provide an absolute value of the difference between an output of an error amplifier and zero volts; and cause switching circuitry to switch an output of the pulse-width modulator between the first power converter and the second power converter depending on whether the load is sourcing or sinking power.

24. The non-transitory computer-readable storage medium of claim 23, wherein the instructions further configure the bidirectional LVPS to provide a signal into the pulse width modulator equal to the difference between the output of the error amplifier and zero volts.

* * * * *

UNITED STATES PATENT AND TRADEMARK OFFICE
CERTIFICATE OF CORRECTION

PATENT NO. : 9,800,129 B2
APPLICATION NO. : 14/612357
DATED : October 24, 2017
INVENTOR(S) : Joe Anthony Ortiz Page 1 of 2

It is certified that error appears in the above-identified patent and that said Letters Patent is hereby corrected as shown below:

In the Claims

In Column 6, Line 29, in Claim 5, after "provide", insert --power--

In Column 6, Line 29, in Claim 5, delete "output" and insert --input-- therefor

In Column 6, Line 32, in Claim 5, delete "form" and insert --from-- therefor

In Column 6, Line 38, in Claim 5, after "converter", insert --or the second power converter--

In Column 6, Line 40, in Claim 5, after "signal", insert --to--

In Column 6, Line 47, in Claim 5, delete "form" and insert --from-- therefor

In Column 6, Line 57, in Claim 5, after "and", insert --the--

In Column 7, Line 47, in Claim 14, after "by", insert --a--

In Column 7, Line 53, in Claim 14, after "for", delete "an"

In Column 7, Line 61, in Claim 14, delete "form" and insert --from-- therefor

In Column 8, Line 1, in Claim 14, after "and", insert --the--

In Column 8, Line 13, in Claim 15, after "drive", insert --signal--

In Column 8, Line 19, in Claim 15, delete "form" and insert --from-- therefor

In Column 8, Line 48, in Claim 16, after "and", insert --the--

Signed and Sealed this
Twenty-first Day of April, 2020

Andrei Iancu
*Director of the United States Patent and Trademark Office*

CERTIFICATE OF CORRECTION (continued)
U.S. Pat. No. 9,800,129 B2

In Column 10, Line 2, in Claim 23, delete "preform" and insert --perform-- therefor In Column 10, Line 9, in Claim 23, delete "convert" and insert --converter-- therefor In Column 10, Line 18, in Claim 23, delete "form" and insert --from-- therefor